United States Patent [19]

Kim

[11] Patent Number: 5,731,901
[45] Date of Patent: Mar. 24, 1998

[54] DUAL FOCUSING OPTICAL PICKUP DEVICE

[75] Inventor: Ki-Tae Kim, Seoul, Rep. of Korea

[73] Assignee: Daewoo Electronics Co., Ltd., Seoul, Rep. of Korea

[21] Appl. No.: 772,748

[22] Filed: Dec. 23, 1996

[30] Foreign Application Priority Data

Dec. 22, 1995 [KR] Rep. of Korea ............... 1995-54332

[51] Int. Cl.$^6$ .................................................. G02B 27/14
[52] U.S. Cl. ..................... 359/629; 359/630; 359/625; 359/636
[58] Field of Search ............................ 359/629, 630, 359/625, 636

[56] References Cited

U.S. PATENT DOCUMENTS

| | | | |
|---|---|---|---|
| 2,183,249 | 12/1939 | Shering et al. | 359/64 |
| 4,805,992 | 2/1989 | Maeda | 359/629 |
| 4,892,371 | 1/1990 | Yamada et al. | 359/629 |
| 5,251,198 | 10/1993 | Strickler. | |

*Primary Examiner*—Frank G. Font
*Assistant Examiner*—Reginald A. Ratliff
*Attorney, Agent, or Firm*—Beveridge, DeGrandi, Weilacher & Young LLP

[57] ABSTRACT

In a dual focusing optical pickup device, a laser beam is incident on an optical member via a beam splitter. Some part of the incident laser beam is reflected by the optical member and then returned to the beam splitter to be focused on an optical disc. The other part of the incident beam is refracted and transmitted through the optical member and then totally reflected by the reflecting member to return to the optical member. The returned beam is focused to the optical disc via the optical member and the beam splitter. The beam which is reflected by the optical member and the beam which is reflected by the reflecting member after being transmitted through the optical member generate a dual focus on the optical disc, in which the dual focus has different focal distances. Therefore, the optical discs of two kinds in which the recording layers are placed at different distances can precisely be recorded or reproduced, respectively.

8 Claims, 2 Drawing Sheets

DUAL FOCUSING OPTICAL PICKUP DEVICE

BACKGROUND OF THE INVENTION

1. Field of the Invention

The present invention relates to a dual focusing optical pickup device. More particularly, the present invention relates to a dual focusing optical pickup device which generates a dual focus on a disc for precisely recording/ reproducing different discs with different thicknesses.

2. Description of the Prior Arts

Data recording/reproducing apparatuses using optical disks such as a laser disk (LD) and a compact disk (CD) have been commercially available in recent years. In order to read out data from an optical disk, a laser beam is irradiated onto a data recording track (to be referred to as a "track" hereinafter), and data are reproduced based on the beam reflected by the track.

When the tracks are helically formed on the optical disk, since the sectors of a single track are not equidistant from the center of the rotation of the disk, tracking (radial) control is necessary in the read mode to accurately irradiate the track with a laser beam. Even though the tracks are concentrically formed, sectors of a single track are not equidistant from the center of the rotation of the disk due to the eccentricity in the disk, and therefore, tracking control is essential. This tracking control has been conventionally performed by one beam method or three beam method.

Furthermore, since the distance from the optical pickup to disk shifts minutely in the read mode in which the disk is rotated, it is difficult to correctly read data due to the shift, thus rendering focusing control essential. This focusing control has been conventionally performed by astigmatic method using astigmatism or a knife edge method.

As a typical conventional example of a tracking circuit, a lens tracking circuit may be mentioned wherein an objective lens is moved in response to a tracking error signal derived from the beam reflected by or transmitted through an optical disk, e.g., one beam or three beams formed from a beam irradiated from the laser by the one beam method or three beam method. The objective lens is normally supported and fixed by a spring on an optical head housing. A tracking actuator is energized to move the lens for the tracking control. When the tracking actuator is deenergized, the lens is held at a mechanically neutral point balanced by a spring force.

When the track eccentricity exceeds twenty or thirty microns, the objective lens deviates greatly from the mechanically neutral point, thereby combining an optical offset signal with the tracking error signal. The laser beam then traces a wrong track in response to the optical offset signal. In order to eliminate the optical offset signal, a tracking system called a two-step servo system has been developed, as described in U.S. Pat. No. 4,761,773. According to this system, the carriage and hence the optical pickup itself as well as the objective lens are moved to perform cooperative tracking.

As a typical conventional example of a focusing circuit, a lens focusing circuit may be mentioned wherein an objective lens is moved in response to a focusing error signal derived from laser beam which is irradiated from laser source and then reflected by or transmitted through an optical disk. The objective lens is normally the same lens that is used for the tracking control. A focusing actuator is energized to move the lens for the focusing control. When the focusing actuator is deenergized, the lens is held at a mechanically neutral point balanced by a spring force.

The conventional optical pickup actuators are classified into actuators of two types. The objective lens is moved in vertical (focusing) direction and horizontal (tracking) direction using optical pickup actuator.

For example, there is one type that focusing and tracking coils are placed in the orthogonal and parallel directions, respectively. In this case, when focusing control signal F is applied to the focusing coil, the objective lens is moved up and down, and when tracking control signal T is applied to the tracking coil, the objective lens is moved right and left.

Furthermore, there is the other type that the two coils are placed in directions which are 45°/45° against optical axis respectively. In this case, when the difference of focusing control signal F and tracking control signal T is applied to the A coil, the sum of focusing control signal F and tracking control signal T is applied to the B coil.

$$A=F-T, B=F+T$$

The sum of the signals which are applied to the two coils is $$B+A=(F+T)+(F-T)=2F$$

to transfer the objective lens in the focusing direction.

The difference of the signals which are applied to the two coils is $$B-A=(F+T)-(F-T)=2T$$

to transfer the objective lens in the tracking direction.

The conventional optical pickup apparatus having the above-mentioned optical pickup actuator will be described in detail with reference to FIG. 1.

FIG. 1 is a schematic view for showing a conventional optical pickup apparatus.

One laser diode 10 is provided as a light source to emit a laser beam. The laser beam emitted from laser diode 10 is reflected from a beam splitter 11 to be bent by 90°. This beam is changed into parallel beams through collimator lens 12. Then the beam is diffracted through hologram device 13. The diffracted beam can be focused on disc D1 or D2 by going through objective lens 14. An optical pickup actuator 19 is installed around objective lens 14 so that the laser beam can be minutely focused on the disc D1 or D2. Hologram device 13 has hologram lattices 15 formed on the central part of its surface.

Hereinafter, an operation of the above-mentioned optical pickup apparatus will be described.

The disc, for example, 1.2 mm disc D1 is loaded in deck which is operated by dual-focusing method. The laser beam is emitted from laser diode 10. The laser beam emitted from laser diode 10 is reflected from a beam splitter 11 to be bent by 90°. This beam is changed into a parallel beam through collimator lens 12. After the parallel beam is diffracted through hologram device 13, the beam passes through objective lens 14. The diffracted beam may be focused on a pit of 1.2 mm disc D1.

At this time, one part of the beams incident on the hologram device through objective lens 14 is diffracted through hologram lattices 15, and so efficiency is maintained only for the first order diffracted beam among the diffracted beams. That is, the first-order diffracted beam with the greater focal distance is focused on the pit of 1.2 mm disc D1. Thus, the reflected beam is returned toward beam splitter 11. The beam is received on photodiode 17 via beam splitter 11 to be used in reproducing information. The optical pickup actuator 19 carries out the minute tracking and focusing servo controls on the minute tracking and focusing errors made in reproducing information.

Meanwhile, when 0.6 mm disc D2 is loaded in deck which is operated by dual-focusing method, efficiency is maintained only for the zero-order diffracted beam, i.e. the non-diffracted beam. That is, the zero-order diffracted beam with the smaller focal distance is focused on the pit of 0.6 mm disc D2.

Thus, the optical pickup apparatus is operated in the same manner as 1.2 mm disc D1 to reproduce information on 0.6 mm disc and to carry out tracking and focusing servos.

In the conventional optical pickup apparatus for dual-focusing, it is difficult to make the hologram device which forms dual focuses. Thereby, there is the problem that the manufacturing cost of the optical pickup apparatus for dual-focusing is increased.

Since the conventional optical pickup apparatus for dual-focusing has a collimator lens as well as hologram, there is the problem that the whole construction of the optical pickup apparatus is complicated.

SUMMARY OF THE INVENTION

The present invention is intended to overcome the above-mentioned and numerous other disadvantages and deficiencies of the prior art. Therefore, it is an object of the present invention to provide a dual focusing optical pickup device which generates a dual focus on a optical disc for precisely recording/reproducing different optical discs with different thicknesses.

To achieve the above object of the present invention, there is provided a dual focusing optical pickup device which comprises:

a laser source;

a beam splitting means for partially reflecting and partially transmitting a laser beam irradiated from the laser source;

an optical member for partially reflecting and partially transmitting an incident beam, the laser beam reflected by the beam splitting means being incident onto the optical member, some part of the incident laser beam being reflected by the optical member to return to the beam splitter and the other part being transmitted through the optical member;

a reflecting member for reflecting a beam transmitted through the optical member;

an objective lens for focusing beams onto an optical disc wherein the beams proceed respectively toward the optical disc via the beam splitter after being reflected by the optical member and the reflecting member; and a detecting means for receiving and detecting beams which are incident on and reflected by the beam splitter after being reflected from the optical disc, wherein the beams focused onto the optical disc are separated into the beam reflected by the optical member and the beam reflected by the reflecting member after being transmitted through the optical member and then generate different dual focuses on the optical disc.

A difference between a focal distance of the beam reflected by the optical member and a focal distance of the beam reflected by the reflecting member after being transmitted through the optical member is determined by controlling an optical distance between reflecting surfaces of the optical member and the reflecting member.

The reflecting member is a totally reflecting plate.

To achieve the above object of the present invention, there is provided a dual focusing optical pickup device which comprises:

a hologram element for being provided with a laser source to emit a laser beam, a photo detector to detect return beams from a disc, and a hologram lattice to diffracting the emitted beam and the return beams;

a beam splitting means for partially reflecting and partially transmitting a laser beam irradiated from the hologram element;

an optical member for partially reflecting and partially transmitting an incident beam, the laser beam reflected by the beam splitting means being incident onto the optical member, some part of the incident laser beam being reflected by the optical member to return to the beam splitter and the other part being transmitted through the optical member;

a reflecting member for reflecting a beam transmitted through the optical member; and an objective lens for focusing beams onto an optical disc wherein the beams proceed respectively toward the optical disc via the beam splitter after being reflected by the optical member and the reflecting member.

According to the dual focusing optical pickup device of the present invention, since the optical member partially transmits and partially reflects an incident beam and the reflecting member totally reflects an incident beam, a beam which is focused onto the optical disc is separated into the beam reflected by the optical member and the beam reflected by the reflecting member after being transmitted through the optical member and then the separated beams generate different a dual focus on the optical disc, so that the optical discs of two kinds with different thickness in which the recording layers are placed at different distances can be precisely recorded/reproduced by the separated beams, respectively.

Furthermore, a difference between focal distances of the beam reflected by the optical member and the beam reflected by the reflecting member after being transmitted through the optical member is determined by controlling an optical distance between reflecting surfaces of the optical member and the reflecting member, so that the process to focus the beams onto each of the optical discs with different thickness is easy as well as accurate.

The difference between the focal distances of the beams can be determined only by controlling a distance between the optical member and the reflecting member, and does not require the positioning precision. Therefore, the process to construct the optical pickup device is easy, and thus, the errors generation ratio of the optical pickup devices is sharply decreased.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENTS

Hereinafter, the preferred embodiments of this invention will be described in detail with reference to the accompanying drawing.

Figure 1:
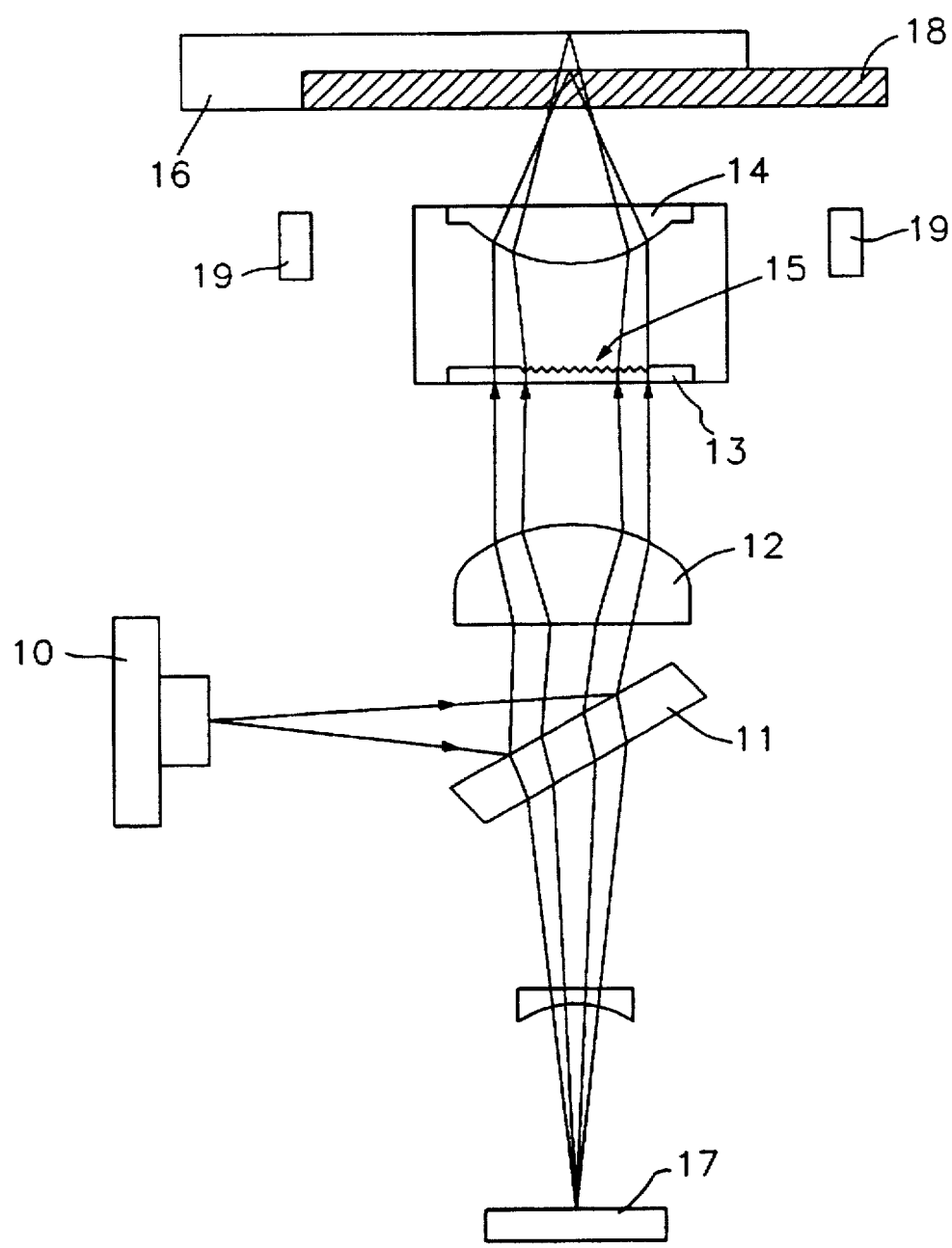
FIG. 1 is a schematic view for showing a conventional dual focusing optical pickup device.
Figure 2:
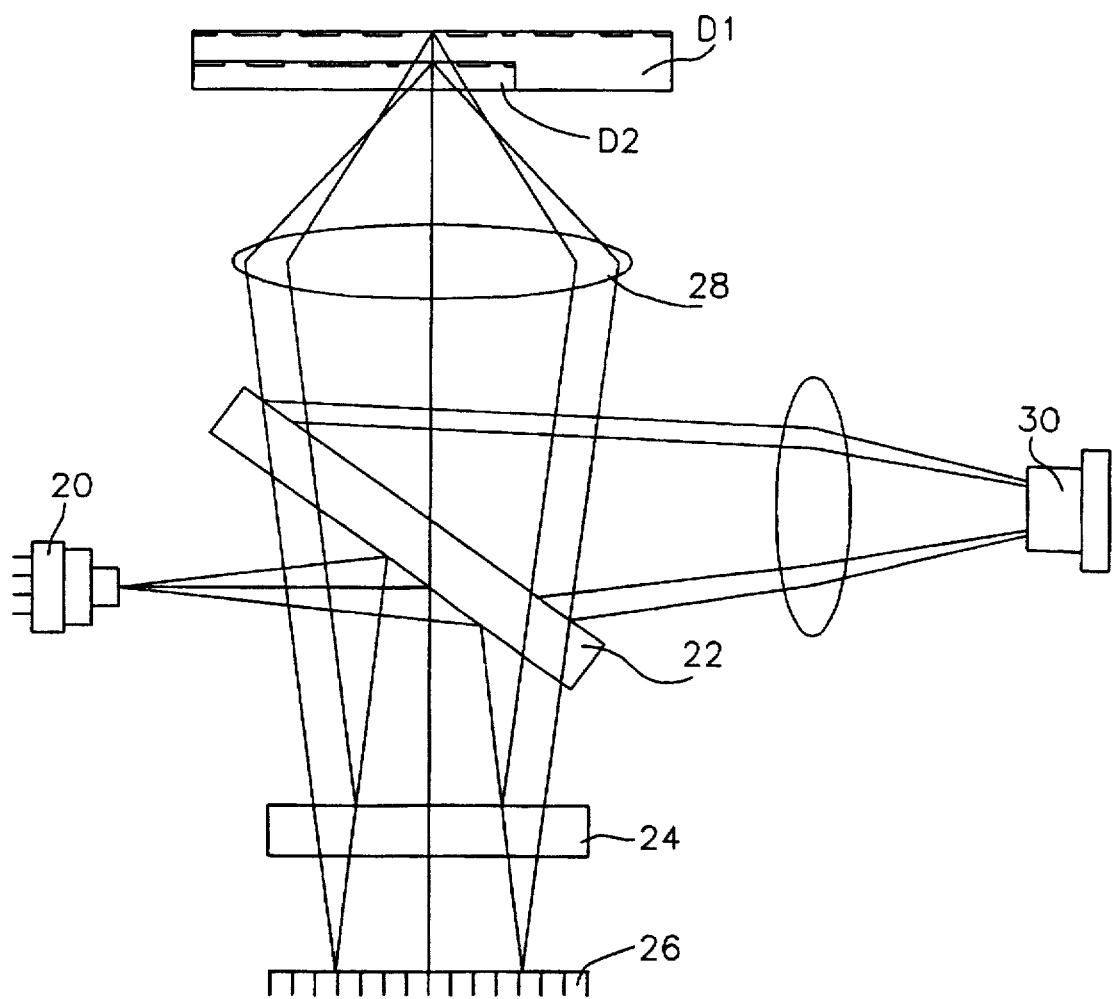
FIG. 2 is a schematic view for showing a dual focusing optical pickup device of the present invention.

FIG. 2 is a schematic view for showing a dual focusing optical pickup device of the present invention.

A reference numeral 20 is a laser diode for emitting the laser beam. A beam splitter 24 is installed on the optical path in order that the laser beam emitted from laser diode 20 proceeds toward an optical disc D1 (an optical disc of thickness 1.2 mm) or D2 (an optical disc of thickness 0.6 mm). The laser beam irradiated from laser diode 20 is incident on the beam splitter 22 and then partially reflected and partially transmitted by the beam splitter 22.

A lens 24 which partially reflects and partially transmits an incident beam is arranged at an opposite position to the optical disc D1 or D2 centering on the beam splitter 22. The beam reflected from the beam splitter 22 is incident on the lens 24, and some part of the incident beam is reflected by the lens 24 to return to the beam splitter 22, and the other part of the incident beam is refracted and transmitted through the lens 24.

A reflecting plate 26 is arranged on the optical path of the beam which is transmitted through lens 24. The reflecting plate 26 returns the transmitted beam toward the lens 24.

The laser beam focused on the optical disc D1 or D2 is reflected.

An objective lens 28 is installed between the beam splitter 22 and the optical disc D1 or D2, so that each of beams which proceed to the optical disc via the beam splitter 22 can be focused onto the optical disc by the objective lens 28.

The beams which are focused onto the optical disc D1 or D2 are reflected by the optical disc, and then are incident on and reflected by the beam splitter 22 to be received on the photo detector 30.

The laser diode 20 and the photo detector 30 can be replaced by a hologram element which is provided with a laser source to emit a laser beam, a photo detector to detect return beams from a disc, and a hologram lattice to diffracting the emitted beam and the return beams.

Hereinafter, an operation of the optical pickup device of the present invention will be described.

The optical disc, for example a 1.2 mm optical disc D1, is loaded in deck which is operated by dual-focusing method. The laser beam is emitted from laser diode 20.

The laser beam emitted from laser diode 20 is reflected from a beam splitter 21 to be bent by 90°.

The bent beam is incident on the lens 24, and some part of the incident beam is reflected by the lens 24 to return to the beam splitter 22, and the other part of the incident beam is refracted and transmitted through the lens 24.

The beam which is reflected by the lens 24 to return to the beam splitter 22 is transmitted through the beam splitter 22, and then focused on the optical disc D1 via the objective lens 28.

The focused beam on the optical disc D1 is reflected by the optical disc D1, and then incident on and reflected by the beam splitter 22 to be received on the photo detector 30, whereby information on the optical disc is recorded or reproduced with precision.

Meanwhile, the refracted and transmitted beam through the lens 24 is totally reflected by the reflecting plate 26 to return to the lens 24. This beam proceeds toward the optical disc D1 via lens, beam splitter 22, and the objective lens 28.

That is, since the path of the beam is changed by an interval between the lens 24 and the reflecting plate 26, the focal distance of the beam reflected by the reflecting plate 26 is smaller than that of the beam reflected by the lens 24.

The difference between the two focal distances is in proportion to the optical distance between reflecting surfaces of the lens 24 and the reflecting plate 26, i.e., in proportion to the distance between the lens 24 and the reflecting plate 26 and thickness and refractive index of the lens 24, respectively.

Accordingly, in constructing the present optical pickup device, the difference between the dual focal distances of the beams is determined only by controlling a distance between the lens 24 and the reflecting plate.

According to the dual focusing optical pickup device of the present invention, since the optical member partially transmits and partially reflects an incident beam and the reflecting member totally reflects a incident beam, a beam which is focused onto the optical disc is separated into the beam reflected by the optical member and the beam reflected by the reflecting member after being transmitted through the optical member and then the separated beams generate different dual focuses on the optical disc, so that the optical discs of two kinds with different thickness in which the recording layers are placed at different distances can be precisely recorded/reproduced by the separated beams, respectively.

Furthermore, a difference between focal distances of the beam reflected by the optical member and the beam reflected by the reflecting member after being transmitted through the optical member is determined by an optical distance between reflecting surfaces of the optical member and the reflecting member, so that the process to focus the beams onto each of the optical discs with different thickness is easy as well as accurate.

The difference between the focal distances of the beams can be determined only by controlling a distance between the optical member and the reflecting member, and does not require the positioning precision. Therefore, the process to construct the optical pickup device is easy, and thus, the errors generation ratio of the optical pickup devices is sharply decreased.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. A dual focusing optical pickup device which comprises:

a laser source;

a beam splitting means for partially reflecting and partially transmitting a laser beam irradiated from the laser source;

an optical member for partially reflecting and partially transmitting an incident beam, the laser beam reflected by the beam splitting means being incident onto the optical member, some part of the incident laser beam being reflected by the optical member to return to the beam splitter and the other part being transmitted through the optical member;

a reflecting member for reflecting a beam transmitted through the optical member;

an objective lens for focusing beams onto an optical disc wherein the beams proceed respectively toward the optical disc via the beam splitter after being reflected by the optical member and the reflecting member; and a detecting means for receiving and detecting beams which are incident on and reflected by the beam splitter after being reflecting from the optical disc, wherein the beams focused onto the optical disc are separated into the beam reflected by the optical member and the beam reflected by the reflecting member after being transmitted through the optical member and then generate different dual focuses on the optical disc.

2. A dual focusing optical pickup device as claimed in claim 1, wherein a difference between a focal distance of the beam reflected by the optical member and a focal distance of the beam reflected by the reflecting member after being transmitted through the optical member is determined by controlling an optical distance between reflecting surfaces of the optical member and the reflecting member.

3. A dual focusing optical pickup device as claimed in claim 1, wherein a difference between a focal distance of the beam reflected by the optical member and a focal distance of the beam reflected by the reflecting member after being transmitted through the optical member is determined by controlling a distance between reflecting surfaces of the optical member and the reflecting member.

4. A dual focusing optical pickup device as claimed in claim 1, wherein the reflecting member comprises a totally reflecting plate.

5. A dual focusing optical pickup device which comprises:

a hologram element for being provided with a laser source to emit a laser beam, a photo detector to detect return beams from an optical disc, and a hologram lattice to diffracting the emitted beam and the return beams;

a beam splitting means for partially reflecting and partially transmitting laser beams emitted from the hologram element;

an optical member for partially reflecting and partially transmitting an incident beam, the laser beam reflected by the beam splitting means being incident onto the optical member, some part of the incident laser beam being reflected by the optical member to return to the beam splitter and the other part being transmitted through the optical member;

a reflecting member for reflecting a beam transmitted through the optical member; and an objective lens for focusing beams onto the optical disc wherein the beams proceed respectively toward the optical disc via the beam splitter after being reflected by the optical member and the reflecting member, wherein the beams focused onto the optical disc are separated into the beam reflected by the optical member and the beam reflected by the reflecting member after being transmitted through the optical member and then generate different dual focuses on the optical disc.

6. A dual focusing optical pickup device as claimed in claim 5, wherein a difference between a focal distance of the beam reflected by the optical member and a focal distance of the beam reflected by the reflecting member after being transmitted through the optical member is determined by controlling an optical distance between reflecting surfaces of the optical member and the reflecting member.

7. A dual focusing optical pickup device as claimed in claim 5, wherein a difference between a focal distance of the beam reflected by the optical member and a focal distance of the beam reflected by the reflecting member after being transmitted through the optical member is determined by controlling a distance between reflecting surfaces of the optical member and the reflecting member.

8. A dual focusing optical pickup device as claimed in claim 5, wherein the reflecting member comprises a totally reflecting plate.

* * * * *